United States Patent [19]
Shibahara

[11] Patent Number: 6,104,463
[45] Date of Patent: Aug. 15, 2000

[54] IN-PLANE SWITCHING TYPE LIQUID CRYSTAL DISPLAY AND METHOD OF OPERATING THE SAME

[75] Inventor: Hideo Shibahara, Tokyo, Japan

[73] Assignee: NEC Corporation, Tokyo, Japan

[21] Appl. No.: 09/181,338

[22] Filed: Oct. 28, 1998

[30] Foreign Application Priority Data

Oct. 31, 1997 [JP] Japan ................................ 9-316102

[51] Int. Cl.[7] .............................................. G02F 1/1343
[52] U.S. Cl. ............................ 349/141; 349/61; 349/69; 349/70
[58] Field of Search ........................... 349/141, 61, 69, 349/70; 345/102

[56] References Cited

FOREIGN PATENT DOCUMENTS

| | | |
|---|---|---|
| 63-37785 | 2/1988 | Japan . |
| 63-21907 | 5/1988 | Japan . |
| 63-228127 | 9/1988 | Japan . |
| 63-296017 | 12/1988 | Japan . |
| 1-262525 | 10/1989 | Japan . |
| 4-241320 | 8/1992 | Japan . |
| 405113562A | 5/1993 | Japan . |
| 5-505247 | 8/1993 | Japan . |
| 5-249444 | 9/1993 | Japan . |
| 406242416A | 9/1994 | Japan . |
| 7-159786 | 6/1995 | Japan . |
| 10-10529 | 1/1998 | Japan . |
| 410010529A | 1/1998 | Japan . |

*Primary Examiner*—James A. Dudek
*Attorney, Agent, or Firm*—Sughrue, Mion, Zinn, Macpeak & Seas, PLLC

[57] ABSTRACT

There is provided an in-plane switching type liquid crystal display including (a) a first transparent substrate, (b) a pixel electrode and a common electrode both formed on an upper surface of the first transparent substrate so that they are spaced away from each other, (c) a second transparent substrate spaced away from the first transparent substrate in parallel, (d) a color filter formed on the second transparent substrate so that the color filter faces the upper surface of the first transparent substrate, (e) a liquid crystal layer sandwiched between the first and second transparent substrates, (f) a pair of polarizing plates sandwiching the first and second transparent substrates therebetween, (g) a back-light source for emitting a back-light through a lower surface of the first transparent substrate, and (h) a chromaticity controller for controlling chromaticity of the back-light in such a manner that chromaticity of the back-light is determined in accordance with chromaticity variation in display nonuniformity caused by a dispersion in a distance between the first and second transparent substrates, to thereby nearly equalize the chromaticity of the back-light to chromaticity in the display nonuniformity for rendering the display nonuniformity inconspicuous. The above-mentioned liquid crystal display reduces display nonuniformity in a display screen.

16 Claims, 7 Drawing Sheets

IN-PLANE SWITCHING TYPE LIQUID CRYSTAL DISPLAY AND METHOD OF OPERATING THE SAME

BACKGROUND OF THE INVENTION

1. Field of the Invention

The invention relates to an in-plane switching type liquid crystal display, and more particularly to an in-plane switching type liquid crystal display which scarcely has display nonuniformity. The invention also relates to a method of operating an in-plane switching type liquid crystal display with less display nonuniformity.

2. Description of the Related Art

A conventional liquid crystal display generally includes a pair of transparent electrodes each formed on a substrate and facing each other, for actuating a liquid crystal layer. In such a liquid crystal display, liquid crystal is actuated in accordance with twisted nematic display process wherein an electric field applied to liquid crystal is directed almost perpendicular to substrates to thereby perpendicularly orient liquid crystal molecules having been horizontally oriented, by the perpendicularly directed electric field.

However, the twisted nematic display process is accompanied with a problem that since the liquid crystal molecules have a certain angle relative to the substrates when perpendicularly oriented by the electric field, brightness varies in accordance with a visual angle, resulting in that it would be impossible to broaden an angle of visibility.

In order to solve the problem, Japanese Patent Publication No. 63-21907, Japanese Unexamined Patent Publication No. 5-505247 (WO91/10936), and Japanese Unexamined Patent Publication No. 7-159786 have suggested an in-plane switching type liquid crystal display including a comb electrode pair, where an electric field to be applied to liquid crystal is directed almost in parallel with substrates to thereby horizontally rotate liquid crystal molecules by the electric field.

Since liquid crystal molecules are kept in parallel with substrates in the above-mentioned in-plane switching type liquid crystal display, it is possible to have a broader angle of visibility than a conventional twisted nematic type liquid crystal display. Hence, an in-plane switching type liquid crystal display is expected to be used as a monitor screen.

Figure 1A:
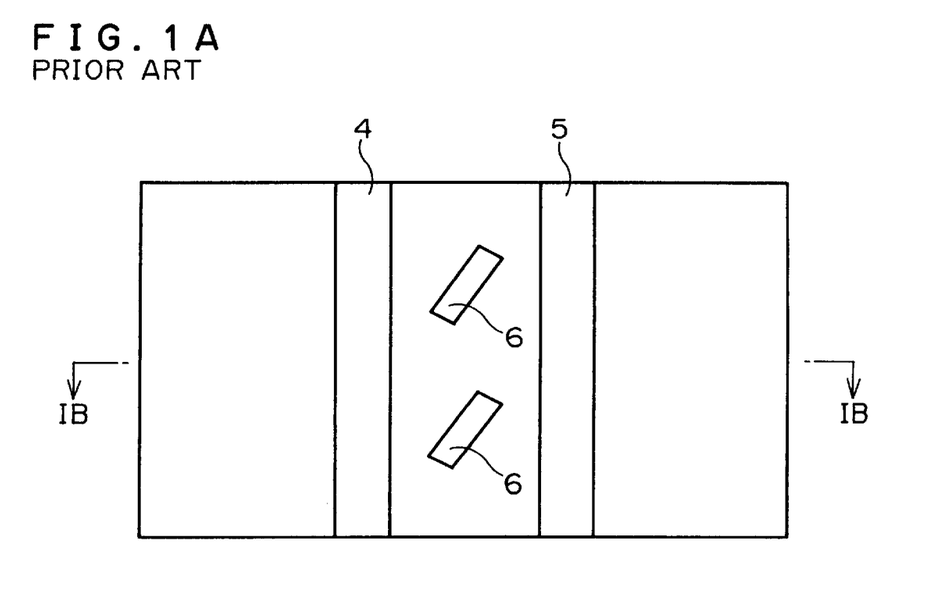
FIG. 1A is a plan view of a conventional in-plane switching type liquid crystal display.
Figure 1B:
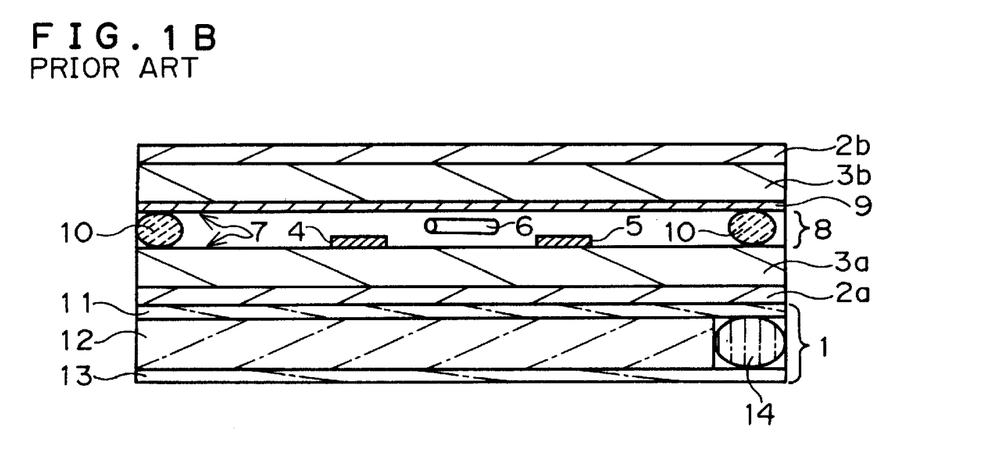
FIG. 1B is a cross-sectional view taken along the line of IB—IB in FIG. 1A.

FIGS. 1A and 1B illustrate an in-plane switching type liquid crystal display suggested in the above-mentioned Japanese Unexamined Patent Publication No. 7-159786. FIG. 1A is a plan view of the suggested liquid crystal display, and FIG. 1B is a cross-sectional view taken along the line IB—IB.

As illustrated in FIG. 1B, the liquid crystal display is comprised of a first glass substrate 3a, a pixel electrode 4 and a common electrode 5 both formed on the first glass substrate 3a, a second glass substrate 3b spaced away from the first glass substrate 3a by a gap 7 by sandwiching micro-pearls 10 therebetween as a spacer, a liquid crystal layer 8 sandwiched between the first and second glass substrates 3a and 3b, and containing liquid crystal molecules 6, a color filter 9 formed on the second glass substrate 3b so that the color filter 9 faces the first glass substrate 3a, first and second polarizing plates 2a and 2b sandwiching the first and second glass substrates 3a and 3b therebetween, and a back-light source 1 positioned adjacent to the first polarizing plate 2a.

The back-light source 1 is comprised of a light-conductive plate 12, a fluorescent lamp 14 positioned adjacent to an end surface of the light-conductive plate 12, a light scattering sheet 11 formed on an upper surface of the light-conductive plate 12, and a reflection plate 13 formed on a lower surface of the light-conductive plate 12.

In operation, there is generated an electric field between the pixel electrode 4 and the common electrode 5 in accordance with a voltage difference therebetween, to thereby control a rotation angle of axes of the liquid crystal molecules 6 in accordance with an intensity of the electric field.

Figure 2A:
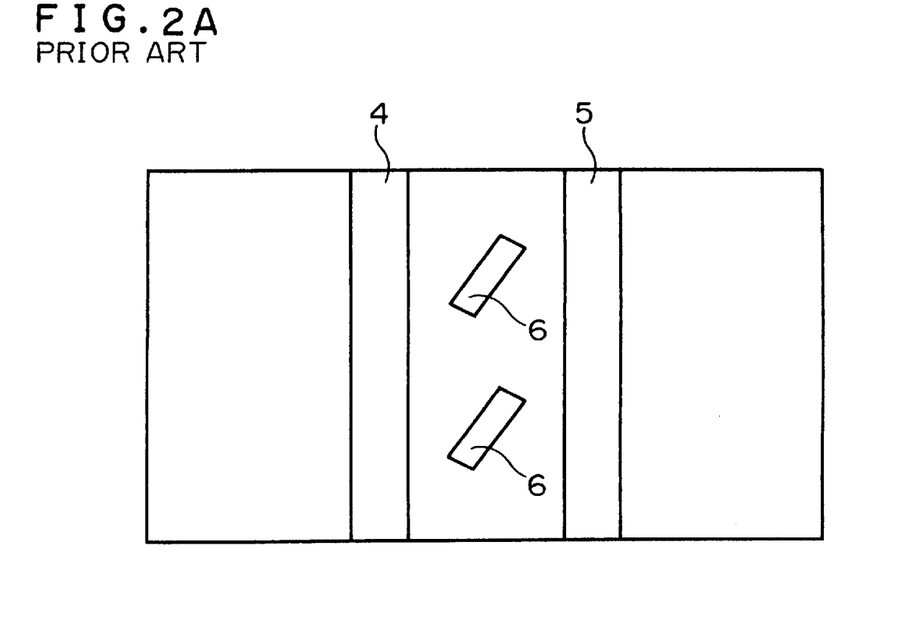
FIG. 2A is a plan view of liquid crystal molecules when no voltages are applied to electrodes, in the liquid crystal display illustrated in FIGS. 1A and 1B.
Figure 2B:
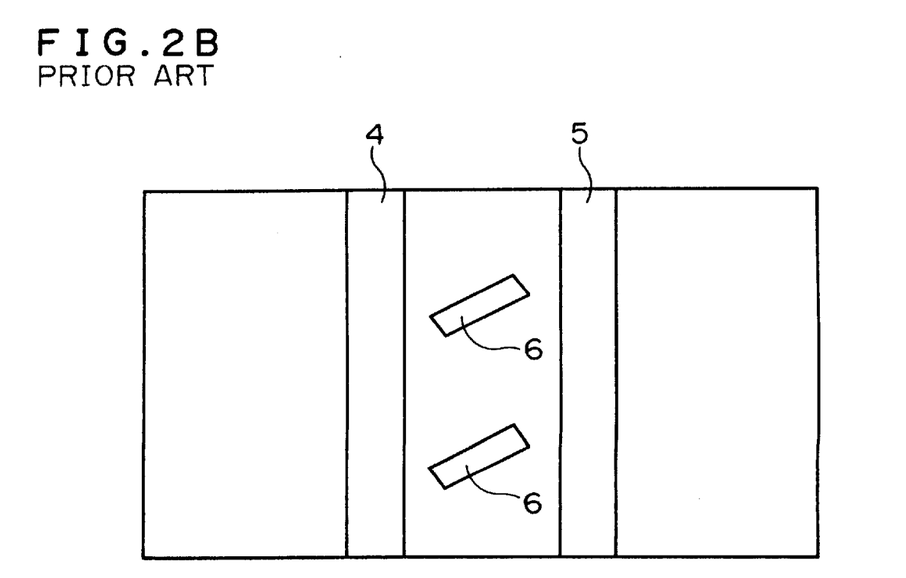
FIG. 2B is a plan view of liquid crystal molecules when voltages are applied to electrodes, in the liquid crystal display illustrated in FIGS. 1A and 1B.

FIG. 2A illustrates a direction of orientation of liquid crystal molecules when no voltages are applied to the pixel electrode 4 and the common electrode 5, and FIG. 2B illustrates a direction of orientation of liquid crystal molecules when voltages are applied to the pixel electrode 4 and the common electrode 5.

As illustrated in FIG. 2A, when no voltages are applied to the pixel electrode 4 and the common electrode 5, the electrodes 4 and 5 are at the same voltage. Hence, the liquid crystal molecules remain to have initial orientation azimuth. On the other hand, as illustrated in FIG. 2B, when voltages are applied to the pixel electrode 4 and the common electrode 5, the electrodes 4 and 5 are at different voltages, resulting in generation of an electric field therebetween. Hence, the liquid crystal molecules are oriented along the electric field.

In general, the first glass substrate 3a is printed with a sealing material layer for hermetically sealing liquid crystal between the first and second glass substrates 3a and 3b. The sealing material layer also acts as an adhesive for adhering the first and second glass substrates to each other. A plurality of balls called micro-pearl and having a diameter of a couple of micrometers are scattered on a surface of the second glass substrate 3b. When the first and second glass substrates 3a and 3b are adhered to each other, the first and second glass substrates 3a and 3b face each other with a gap equal to a diameter of the micro-pearl therebetween. It is quite difficult to uniformize a gap between the facing glass substrates 3a and 3b, and hence, there would be dispersion in the gap in some areas. Such dispersion in the gap causes unbalance in brightness and chromaticity, which in turn causes display nonuniformity.

Comparing unbalance in brightness and chromaticity caused by dispersion in the gap, unbalance in an in-plane switching type liquid crystal display is greater than unbalance in a conventional twisted nematic liquid crystal display. Hence, an in-plane switching type liquid crystal display is required to have gap uniformity to a greater degree than a conventional twisted nematic liquid crystal display.

Figure 3:
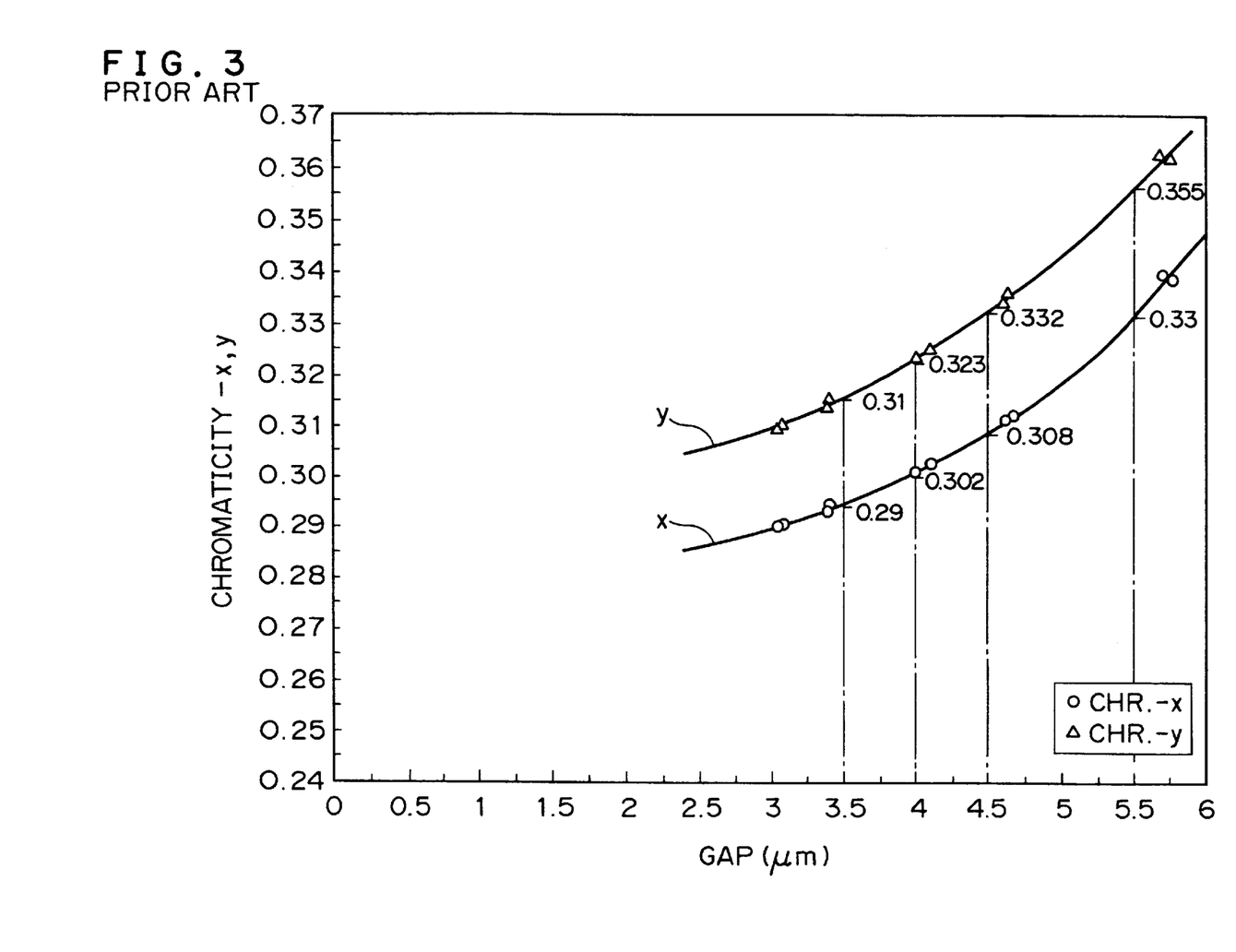
FIG. 3 is a graph showing a relation between chromaticity and a gap formed between substrates, in the liquid crystal display illustrated in FIGS. 1A and 1B.

FIG. 3 illustrates a relation between chromaticity coordinate values "x" and "y", and a gap formed between substrates in a conventional in-plane switching type liquid crystal display.

For instance, if a gap between substrates is set at 4.5 μm, the substrates are spaced away from each other by 4.5 μm in almost all areas. However, in some areas of the substrates, a gap may be greater or smaller than 4.5 μm, in which case, chromaticity and brightness is varied in accordance with the varied gap. Specifically, when an actual gap is smaller than the initially set gap, displayed images are tinged with blue in chromaticity, and brightness is reduced. When an actual gap is greater than the initially set gap, displayed images are tinged with yellow in chromaticity, and brightness is increased. Thus, there occurs display nonuniformity.

Figure 4:
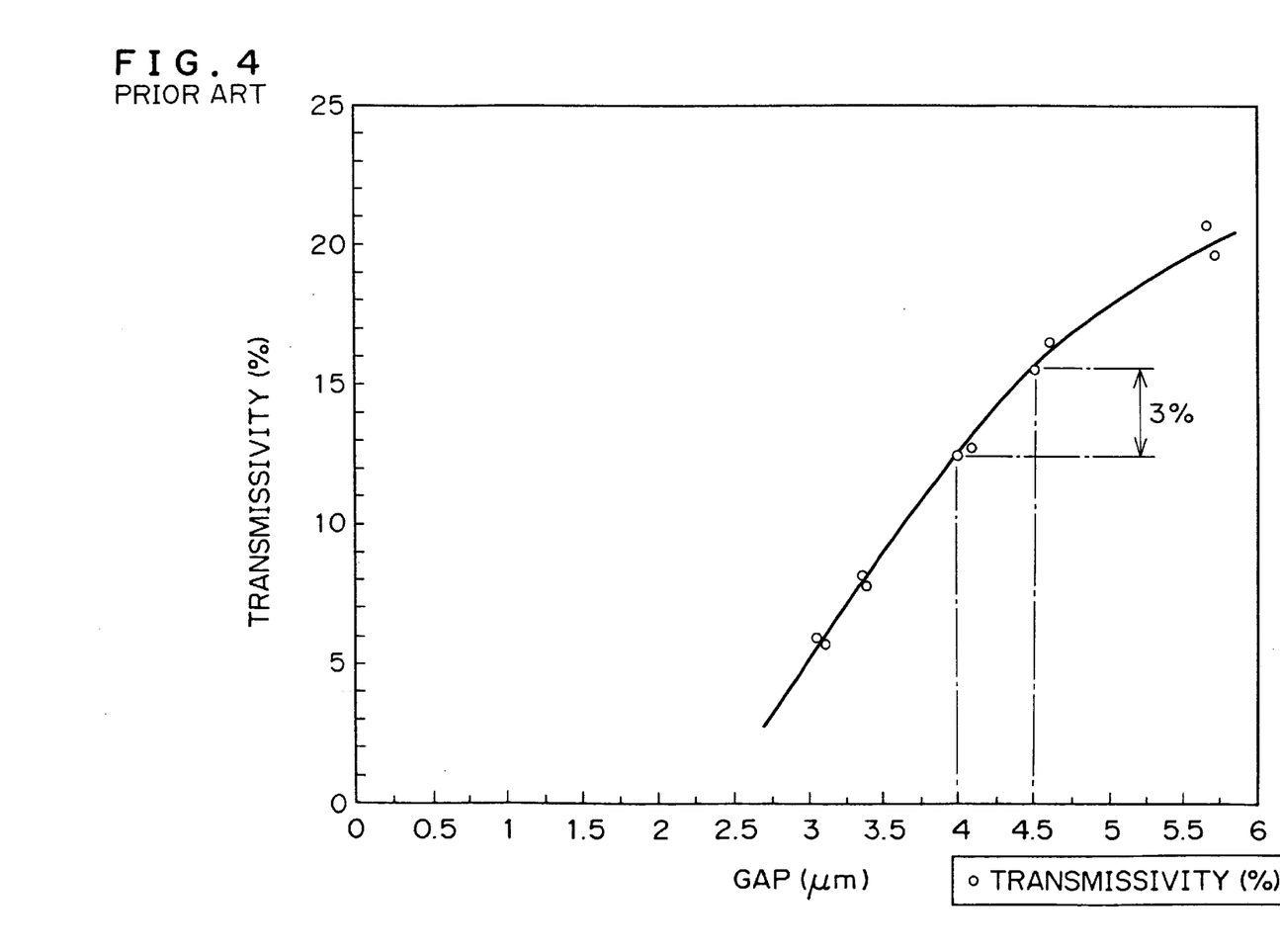
FIG. 4 is a graph showing a relation between transmissivity and a gap formed between substrates, in the liquid crystal display illustrated in FIGS. 1A and 1B.

FIG. 4 illustrates a relation between brightness and a gap formed between substrates in a conventional in-plane switching type liquid crystal display. The brightness also varies in accordance with unbalance in the gap, and hence, there occurs display nonuniformity. Actual dispersion in a gap formed between substrates is generally in the range of about ±0.5 μm.

As discussed above, chromaticity and brightness vary, if an actual gap between substrates is greater or smaller than an initially set gap. However, it has been found that display nonuniformity is more conspicuous when an actual gap is smaller than an initially set gap than when an actual gap is greater than an initially set gap. This is because that brightness variation caused when an actual gap is smaller than an initially set gap is about twice greater than brightness variation caused when an actual gap is greater than an initially set gap.

As having been mentioned so far, in a conventional in-plane switching type liquid crystal display, if an actual gap between substrates is smaller than an initially set gap in some areas, brightness significantly varies to thereby generate display nonuniformity in the areas.

A liquid crystal display is assembled usually by sandwiching a spherical spacer such as the micro-pearl 10 illustrated in FIG. 1B between two substrates. In assembly of a liquid crystal display, there is generated dispersion in a gap between the substrates for various causes such as a pressure. Such dispersion in the gap causes display nonuniformity. As mentioned earlier, display nonuniformity in an in-plane switching type liquid crystal display is greater than display nonuniformity in a conventional twisted nematic liquid crystal display. Accordingly, an in-plane switching type liquid crystal display provides poor quality in images. One of solutions to the problem of display nonuniformity is to make dispersion in the gap smaller. However, significant improvement in making dispersion in the gap smaller is quite difficult to accomplish in present assembly processes.

Japanese Unexamined Patent Publication No. 63-37785 published on Feb. 18, 1988 suggests a liquid crystal display including a memory for storing uniformity data of each liquid crystal panel, which data is established in accordance with transmissivity measured for each of the liquid crystal panels, and means for calculating compensation data based on both image data of each of the liquid crystal panel and the uniformity data stored in the memory.

Japanese Unexamined Patent Publication No. 63-228127 published on Sep. 22, 1988 suggests a liquid crystal display that includes a pair of glass substrates, a pair of polarizing plates, a filter formed on one of the polarizing plates for cutting long wavelength band, and nematic liquid crystal having an twist angle in the range of 180 to 270 degrees, and chiral material both sandwiched between the glass substrates.

Japanese Unexamined Patent Publication No. 63-296017 published on Dec. 2, 1988 suggests a liquid crystal display having a liquid crystal layer containing chiral material, and nematic liquid crystal having an twist angle in the range of 180 to 270 degrees, the nematic liquid crystal further containing material which has high absorbance in long and short wavelength bands.

Japanese Unexamined Patent Publication No. 5-249444 published on Sep. 28, 1993 suggests a liquid crystal display including a liquid crystal layer having a central portion thicker than marginal portions thereof

SUMMARY OF THE INVENTION

In view of the above-mentioned problem in a conventional in-plane switching type liquid crystal display, it is an object of the present invention to provide an in-plane switching type liquid crystal display capable of reducing display nonuniformity, even if there exists dispersion in a gap between substrates in some areas.

It is also an object of the present invention to provide a method of operating an in-plane switching type liquid crystal display so that display nonuniformity is not generated, even if there exists dispersion in a gap between substrates in some areas.

In one aspect, there is provided an in-plane switching type liquid crystal display including (a) a first transparent substrate, (b) a pixel electrode and a common electrode both formed on an upper surface of the first transparent substrate so that they are spaced away from each other, (c) a second transparent substrate spaced away from the first transparent substrate in parallel, (d) a color filter formed on the second transparent substrate so that the color filter faces the upper surface of the first transparent substrate, (e) a liquid crystal layer sandwiched between the first and second transparent substrates, (f) a pair of polarizing plates sandwiching the first and second transparent substrates therebetween, (g) a back-light source for emitting a back-light through a lower surface of the first transparent substrate, and (h) a chromaticity controller for determining chromaticity of the back-light in accordance with chromaticity variation in display nonuniformity caused by a dispersion in a distance between the first and second transparent substrates, to thereby nearly equalize the chromaticity of the back-light to chromaticity in the display nonuniformity for rendering the display nonuniformity inconspicuous.

There is further provided an in-plane switching type liquid crystal display including (a) a first transparent substrate, (b) a pixel electrode and a common electrode both formed on an upper surface of the first transparent substrate so that they are spaced away from each other, (c) a second transparent substrate spaced away from the first transparent substrate in parallel, (d) a color filter formed on the second transparent substrate so that the color filter faces the upper surface of the first transparent substrate, (e) a liquid crystal layer sandwiched between the first and second transparent substrates, (f) a pair of polarizing plates sandwiching the first and second transparent substrates therebetween, (g) a back-light source for emitting a back-light through a lower surface of the first transparent substrate, the back-light source being comprised of at least two fluorescent lamps having different chromaticity, and (h) a chromaticity controller for controlling chromaticity of the back-light to have chromaticity coordinate values of "x" in the range of 0.29 to 0.33 both inclusive and "y" in the range of 0.31 to 0.355 both inclusive when $\Delta n \times d$ is in the range of 0.24 to 0.39 both inclusive, wherein $\Delta n$ indicates index anisotropy of liquid crystal of the liquid crystal layer, and "d" indicates a thickness of the liquid crystal layer.

There is still further provided an in-plane switching type liquid crystal display including (a) a first transparent substrate, (b) a pixel electrode and a common electrode both formed on an upper surface of the first transparent substrate so that they are spaced away from each other, (c) a second transparent substrate spaced away from the first transparent substrate by a distance in parallel, (d) a color filter formed on the second transparent substrate so that the color filter faces the upper surface of the first transparent substrate, (e) a liquid crystal layer sandwiched between the first and second transparent substrates, (f) a pair of polarizing plates sandwiching the first and second transparent substrates therebetween, (g) a back-light source for emitting a back-light through a lower surface of the first transparent substrate, (h) a voltage controller for applying voltages to the pixel electrode and the common electrode to generate an electric field therebetween, and controlling the voltage to control orientation of liquid crystal molecules of the liquid crystal layer for controlling transmissivity of the back-light, and (i) a chromaticity controller for setting chromaticity of the back-light to be lower than chromaticity to be obtained when the first and second transparent substrates are spaced away from each other by the distance.

It is preferable for the above-mentioned in-plane switching type liquid crystal display to further include the back-light source is comprised of at least two fluorescent lamps having different chromaticity.

There is yet further provided an in-plane switching type liquid crystal display including (a) a first transparent substrate, (b) a pixel electrode and a common electrode both formed on an upper surface of the first transparent substrate so that they are spaced away from each other, (c) a second transparent substrate spaced away from the first transparent substrate in parallel, (d) a color filter formed on the second transparent substrate so that the color filter faces the upper surface of the first transparent substrate, (e) a liquid crystal layer sandwiched between the first and second transparent substrates, (f) a pair of polarizing plates sandwiching the first and second transparent substrates therebetween, (g) a back-light source for emitting a back-light through a lower surface of the first transparent substrate, (h) a voltage controller for applying voltages to the pixel electrode and the common electrode to generate an electric field therebetween, and controlling the voltage to control orientation of liquid crystal molecules of the liquid crystal layer for controlling transmissivity of the back-light, and (i) a chromaticity controller for setting chromaticity of the back-light to have chromaticity coordinate values of "x" in the range of 0.29 to 0.33 both inclusive and "y" in the range of 0.31 to 0.355 both inclusive when $\Delta n \times d$ is in the range of 0.24 to 0.39 both inclusive, wherein $\Delta n$ indicates index anisotropy of liquid crystal of the liquid crystal layer, and "d" indicates a thickness of the liquid crystal layer.

It is preferable that a distance between the first and second transparent substrates is set in the range of 3.5 $\mu$m to 5.5 $\mu$m.

In another aspect of the present invention, there is provided a method of operating an in-plane switching type liquid crystal display, including the step of determining chromaticity of back-light in accordance with chromaticity variation in display nonuniformity caused by a dispersion in a distance between transparent substrates, to thereby nearly equalize the chromaticity of the backlight to chromaticity in the display nonuniformity for rendering the display nonuniformity inconspicuous.

There is further provided a method of operating an in-plane switching type liquid crystal display, including the step of controlling chromaticity of back-light to have chromaticity coordinate values of "x" in the range of 0.29 to 0.33 both inclusive and "y" in the range of 0.31 to 0.355 both inclusive when $\Delta n \times d$ is in the range of 0.24 to 0.39 both inclusive, wherein $\Delta n$ indicates index anisotropy of liquid crystal of a liquid crystal layer, and "d" indicates a thickness of the liquid crystal layer.

There is still further provided a method of operating an in-plane switching type liquid crystal display including two transparent substrates spaced away from each other by a distance, the method including the step of setting chromaticity of a back-light to be lower than chromaticity to be obtained when the transparent substrates are spaced away from each other by the distance.

It is preferable that to further include the step of setting a distance between the transparent substrates to be in the range of 3.5 $\mu$m to 5.5 $\mu$m.

The in-plane switching type liquid crystal display, and the method of operating an in-plane switching type liquid crystal display both in accordance with the present invention provide an advantage that display nonuniformity is reduced in areas where an actual gap between substrates is greater or smaller than an initially set gap. As mentioned earlier, the reason for occurrence of display nonuniformity is that brightness is reduced, if an actual gap between substrates is smaller than a desired gap. In accordance with the present invention, chromaticity of a back-light is set lower than chromaticity to be obtained when the substrates are spaced away from each other by a predetermined distance, resulting in that reduction in brightness can be made smaller, even if an actual gap between the substrates is smaller than the abovementioned predetermined distance.

The above and other objects and advantageous features of the present invention will be made apparent from the following description made with reference to the accompanying drawings, in which like reference characters designate the same or similar parts throughout the drawings

DESCRIPTION OF THE PREFERRED EMBODIMENTS

First, the principle of the present invention is explained hereinbelow with reference to FIG. 3 showing a relation between chromaticity coordinate values x and y, and a gap formed between substrates, and FIG. 4 showing a relation between transmissivity and the gap. In FIGS. 3 and 4, index anisotropy $\Delta n$ of liquid crystal is set to be equal to 0.07.

In a conventional liquid crystal display, when a gap between substrates was set equal to 4.5 $\mu$m, chromaticity coordinate values of "x" and "y" of a back-light were set equal to 0.308 and 0.332, respectively, as illustrated in FIG. 3, for obtaining a maximum brightness.

Now, it is assumed that an actual gap between substrates in a certain area is 4.0 m for some reasons, which is smaller than the initially set gap, 4.5 μm. As illustrated in FIG. 3, chromaticity coordinate values of "x" and "y" in the area decrease down to 0.302 and 0.323, respectively. In addition, transmissivity is reduced by about 3%, as illustrated in FIG. 4. The reduction in both the chromaticity coordinate values and transmissivity results in that displayed images are tinged with blue, and are viewed as dark nonuniformity.

Herein, if chromaticity of a back-light is set to be equal to chromaticity obtained when the gap is set equal to 4.0 μm smaller than the previously set gap, 4.5 μm, it is possible to lower the reduction in transmissivity in the display nonuniformity area down to about 1.5%. That is, a degree of display nonuniformity is reduced.

If a gap between substrates is set in the range of 3.5 μm to 5.5 μm, chromaticity coordinate value of "xe" and "y" of a back-light are in the range of 0.29 to 0.33, and 0.31 to 0.355, respectively.

[First Embodiment]

Figure 5A:
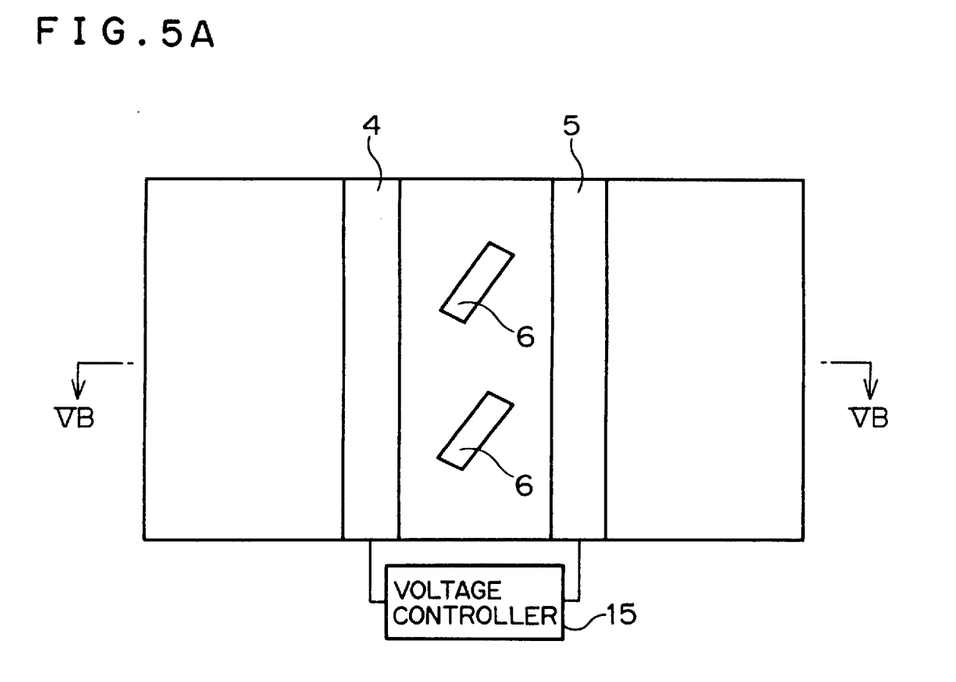
FIG. 5A is a plan view of an in-plane switching type liquid crystal display in accordance with the first embodiment of the present invention.
Figure 5B:
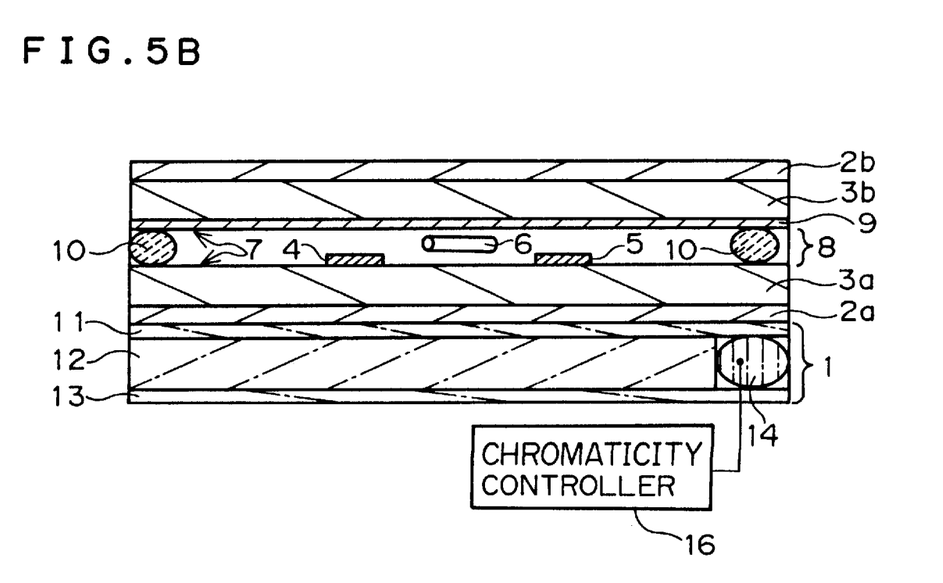
FIG. 5B is a cross-sectional view taken along the line of VB—VB in FIG. 5A.

FIG. 5A is a plan view of an in-plane switching type liquid crystal display in accordance with the first embodiment, and FIG. 5B is a cross-sectional view taken along the line of VB—VB in FIG. 5A.

As illustrated in FIG. 5B, the liquid crystal display is comprised of a first glass substrate 3a, a pixel electrode 4 and a common electrode 5 both formed on the first glass substrate 3a, a second glass substrate 3b spaced away from the first glass substrate 3a by a gap 7 by sandwiching micro-pearls 10 therebetween as a spacer, a liquid crystal layer 8 sandwiched between the first and second glass substrates 3a and 3b, and containing liquid crystal molecules 6, a color filter 9 formed on the second glass substrate 3b so that the color filter 9 faces the first glass substrate 3a, first and second polarizing plates 2a and 2b sandwiching the first and second glass substrates 3a and 3b therebetween, a back-light source 1 positioned adjacent to the first polarizing plate 2a, a voltage controller 15 for applying voltages to the pixel electrode 4 and the common electrode 5 to thereby generate an electric field therebetween, and a chromaticity controller 16 for controlling chromaticity of a back-light emitted from the back-light source 1.

The back-light source 1 is comprised of a light-conductive plate 12, a fluorescent lamp 14 positioned adjacent to an end surface of the light-conductive plate 12, a light scattering sheet 11 formed on an upper surface of the light-conductive plate 12, and a reflection plate 13 formed on a lower surface of the light-conductive plate 12.

The first and second glass substrates 3a and 3b are spaced away from each other by 5.0 μm. Namely, the gap 7 is set to be equal to 5.0 μm.

In operation, the voltage controller 15 applies different voltages to the pixel electrode 4 and the common electrode 5 to thereby generate an electric field between the pixel electrode 4 and the common electrode 5. The liquid crystal molecules 6 contained in the liquid crystal layer 8 are rotated about major axes thereof in accordance with an intensity of the thus generated electric field which intensity is in dependence on a voltage difference between the pixel electrode 4 and the common electrode 5.

The chromaticity controller 16 arranges the back-light 1 to have chromaticity lower than chromaticity obtained when the first and second glass substrates 3a and 3b are spaced away from each other by 4.5 μm.

Figure 7:
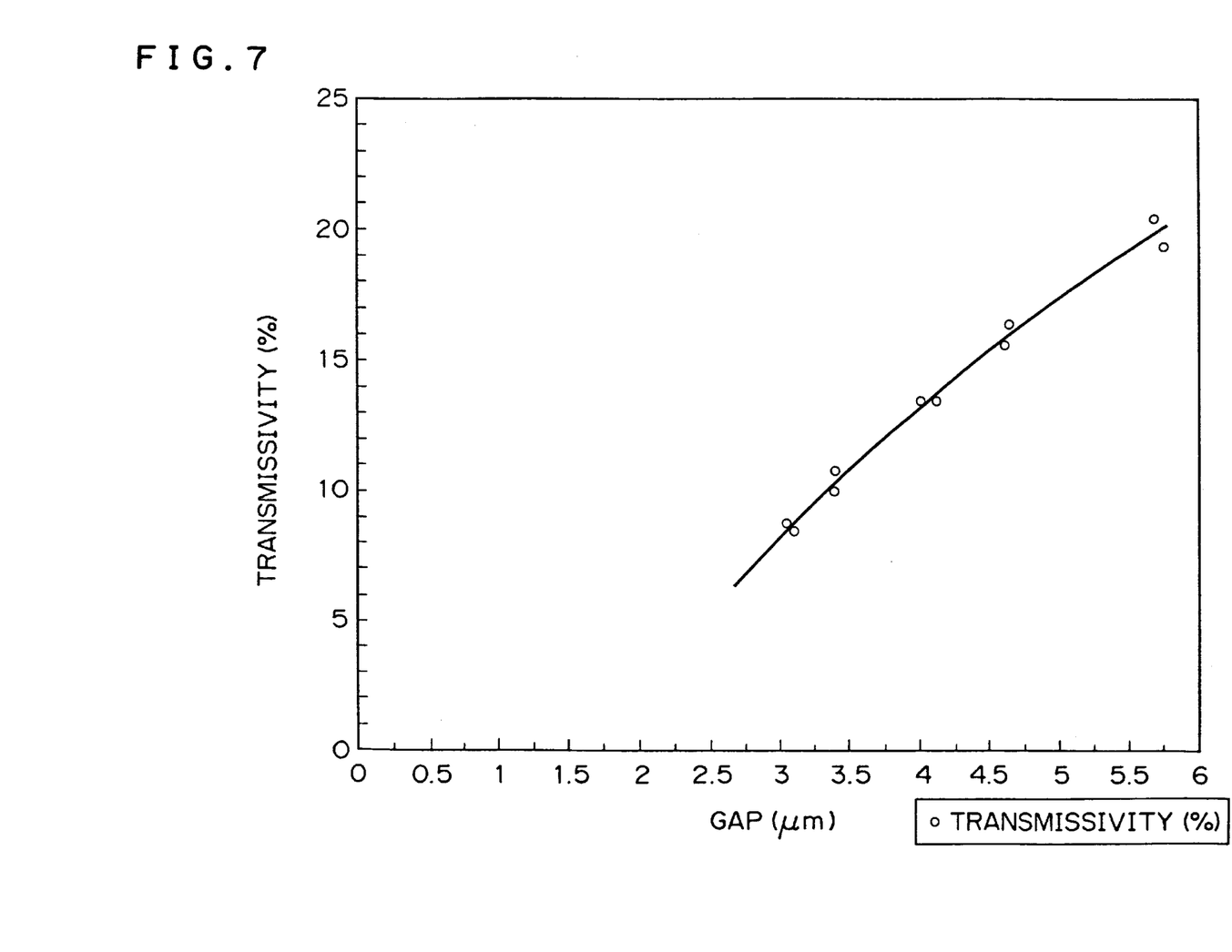
FIG. 7 is a graph showing a relation between transmissivity and a gap formed between substrates, in the liquid crystal display illustrated in FIGS. 6A and 6B.

FIG. 7 shows a relation between the gap 7 and brightness variation in the in-plane switching type liquid crystal display in accordance with the present invention. Comparing FIG. 7 to FIG. 4 showing a relation between the gap and brightness variation in a conventional in-plane switching type liquid crystal display, the reduction in brightness found when an actual gap is smaller than an initially set gap in the in-plane switching type liquid crystal display in accordance with the first embodiment is smaller, specifically almost half, than the same in the conventional in-plane switching type liquid crystal display. Thus, display nonuniformity is certainly reduced in the in-plane switching type liquid crystal display in accordance with the first embodiment.

[Second Embodiment]

Figure 6A:
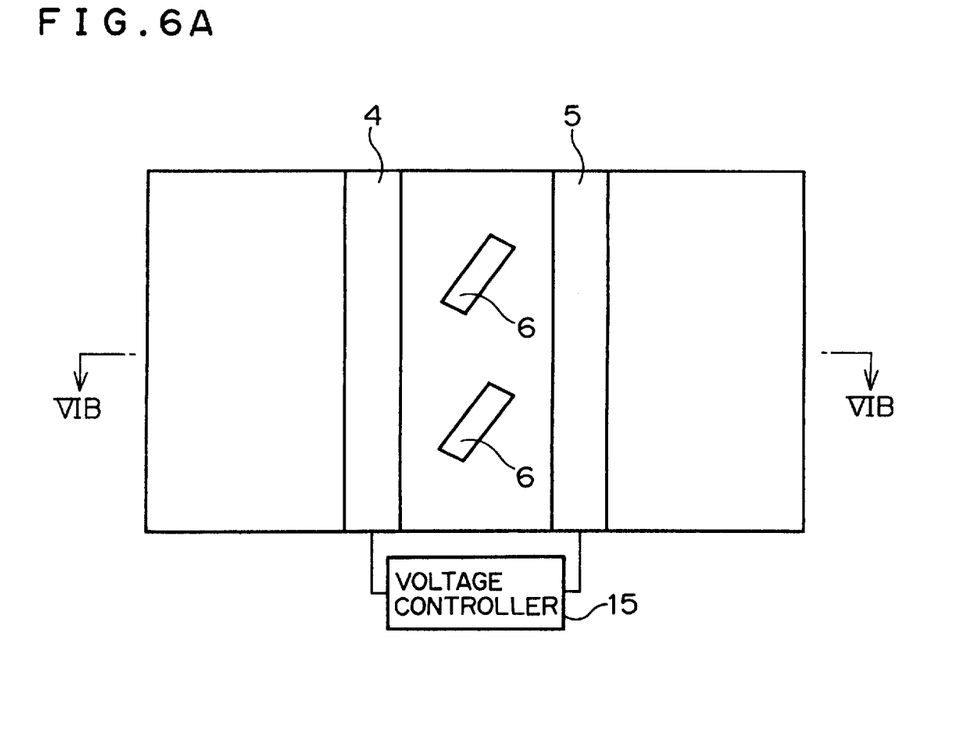
FIG. 6A is a plan view of an in-plane switching type liquid crystal display in accordance with the second embodiment of the present invention.
Figure 6B:
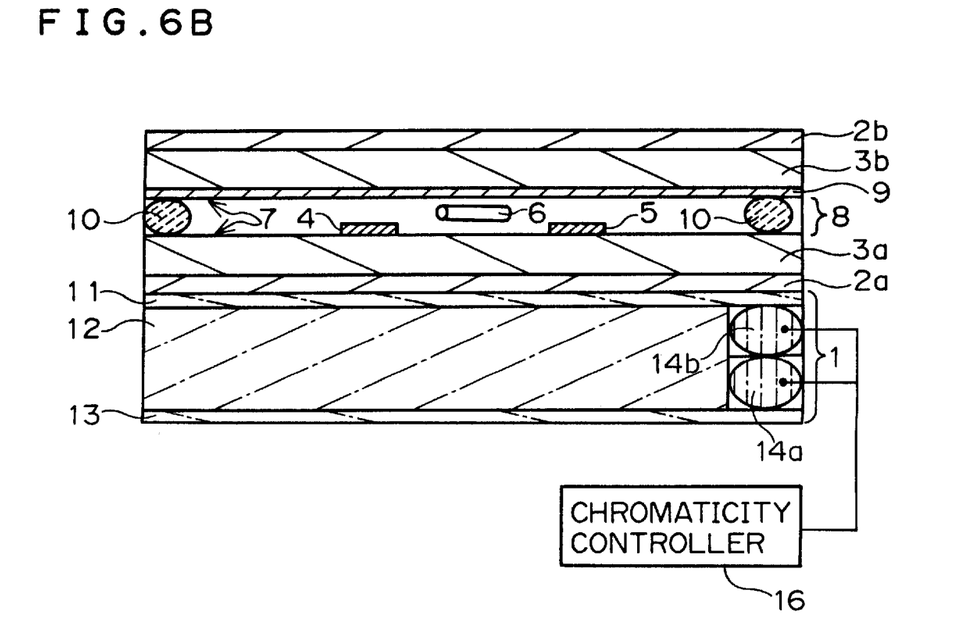
FIG. 6B is a cross-sectional view taken along the line of VIB—VIB in FIG. 6A.

FIG. 6A is a plan view of an in-plane switching type liquid crystal display in accordance with the second embodiment, and FIG. 6B is a cross-sectional view taken along the line of VIB—VIB in FIG. 6A.

The liquid crystal display in accordance with the second embodiment is different from the liquid crystal display in accordance with the first embodiment only in that the back-light source 1 two fluorescent lamps 14a and 14b stacked in a thickness-wise direction of the light-conductive plate 12. The fluorescent lamps 14a and 14b have different chromaticity. Hence, chromaticity of the back-light can be varied by altering voltages to be applied to the fluorescent lamps 14a and 14b.

The first and second glass substrates 3a and 3b are spaced away from each other by 5.0 μm. Namely, the gap 7 is set to be equal to 5.0 μm, similarly to the first embodiment.

In operation, the voltage controller 15 applies different voltages to the pixel electrode 4 and the common electrode 5 to thereby generate an electric field between the pixel electrode 4 and the common electrode 5. The liquid crystal molecules 6 contained in the liquid crystal layer 8 are rotated about major axes thereof in accordance with an intensity of the thus generated electric field which intensity is in dependence on a voltage difference between the pixel electrode 4 and the common electrode 5.

The chromaticity controller 16 arranges the back-light 1 to have chromaticity lower than chromaticity obtained when the first and second glass substrates 3a and 3b are spaced away from each other by 4.5 μm.

FIG. 7 shows a relation between the gap 7 and brightness variation in the in-plane switching type liquid crystal display in accordance with the present invention. Similarly to the first embodiment, the reduction in brightness found when an actual gap is smaller than an initially set gap in the in-plane switching type liquid crystal display in accordance with the second embodiment is smaller, specifically almost half, than the same in the conventional in-plane switching type liquid crystal display. Thus, display nonuniformity is certainly reduced in the in-plane switching type liquid crystal display.

The number of the fluorescent lamps constituting the back-light source 1 is not to be limited to two. The back-light source 1 may have three or more fluorescent lamps.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-316102 filed on Oct. 31, 1997 including specification, claims, drawings and summary is incorporated herein by reference in its entirety.

What is claimed is:

1. An in-plane switching type liquid crystal display comprising:

(a) a first transparent substrate;
(b) a pixel electrode and a common electrode both formed on an upper surface of said first transparent substrate so that they are spaced away from each other;
(c) a second transparent substrate spaced away from said first transparent substrate in parallel;
(d) a color filter formed on said second transparent substrate so that said color filter faces said upper surface of said first transparent substrate;
(e) a liquid crystal layer sandwiched between said first and second transparent substrates;
(f) a pair of polarizing plates sandwiching said first and second transparent substrates therebetween;
(g) a back-light source for emitting a back-light through a lower surface of said first transparent substrate; and
(h) a chromaticity controller for determining chromaticity of said back-light in accordance with chromaticity variation in display nonuniformity caused by a dispersion in a distance between said first and second transparent substrates, to thereby nearly equalize said chromaticity of said back-light to chromaticity in said display nonuniformity for rendering said display nonuniformity inconspicuous.

2. The in-plane switching type liquid crystal display as set forth in claim 1, wherein a distance between said first and second transparent substrates is in the range of 3.5 μm to 5.5 μm.

3. An in-plane switching type liquid crystal display comprising:
(a) a first transparent substrate;
(b) a pixel electrode and a common electrode both formed on an upper surface of said first transparent substrate so that they are spaced away from each other;
(c) a second transparent substrate spaced away from said first transparent substrate in parallel;
(d) a color filter formed on said second transparent substrate so that said color filter faces said upper surface of said first transparent substrate;
(e) a liquid crystal layer sandwiched between said first and second transparent substrates;
(f) a pair of polarizing plates sandwiching said first and second transparent substrates therebetween;
(g) a back-light source for emitting a back-light through a lower surface of said first transparent substrate, said back-light source being comprised of at least two fluorescent lamps having different chromaticity; and
(h) a chromaticity controller for controlling chromaticity of said back-light to have chromaticity coordinate values of "x" in the range of 0.29 to 0.33 both inclusive and "y" in the range of 0.31 to 0.355 both inclusive when $\Delta n \times d$ is in the range of 0.24 to 0.39 both inclusive, wherein $\Delta n$ indicates index anisotropy of liquid crystal of said liquid crystal layer, and "d" indicates a thickness of said liquid crystal layer.

4. The in-plane switching type liquid crystal display as set forth in claim 2, wherein a distance between said first and second transparent substrates is in the range of 3.5 μm to 5.5 μm.

5. An in-plane switching type liquid crystal display comprising:
(a) a first transparent substrate;
(b) a pixel electrode and a common electrode both formed on an upper surface of said first transparent substrate so that they are spaced away from each other;
(c) a second transparent substrate spaced away from said first transparent substrate by a distance in parallel;
(d) a color filter formed on said second transparent substrate so that said color filter faces said upper surface of said first transparent substrate;
(e) a liquid crystal layer sandwiched between said first and second transparent substrates;
(f) a pair of polarizing plates sandwiching said first and second transparent substrates therebetween;
(g) a back-light source for emitting a back-light through a lower surface of said first transparent substrate;
(h) a voltage controller for applying voltages to said pixel electrode and said common electrode to generate an electric field therebetween, and controlling said voltage to control orientation of liquid crystal molecules of said liquid crystal layer for controlling transmissivity of said back-light; and
(i) a chromaticity controller for setting chromaticity of said back-light to be lower than chromaticity to be obtained when said first and second transparent substrates are spaced away from each other by said distance.

6. The in-plane switching type liquid crystal display as set forth in claim 5, wherein a distance between said first and second transparent substrates is in the range of 3.5 μm to 5.5 μm.

7. The in-plane switching type liquid crystal display as set forth in claim 5, wherein said back-light source is comprised of at least two fluorescent lamps having different chromaticity.

8. An in-plane switching type liquid crystal display comprising:
(a) a first transparent substrate;
(b) a pixel electrode and a common electrode both formed on an upper surface of said first transparent substrate so that they are spaced away from each other;
(c) a second transparent substrate spaced away from said first transparent substrate in parallel;
(d) a color filter formed on said second transparent substrate so that said color filter faces said upper surface of said first transparent substrate;
(e) a liquid crystal layer sandwiched between said first and second transparent substrates;
(f) a pair of polarizing plates sandwiching said first and second transparent substrates therebetween;
(g) a back-light source for emitting a back-light through a lower surface of said first transparent substrate;
(h) a voltage controller for applying voltages to said pixel electrode and said common electrode to generate an electric field therebetween, and controlling said voltage to control orientation of liquid crystal molecules of said liquid crystal layer for controlling transmissivity of said back-light; and
(i) a chromaticity controller for setting chromaticity of said back-light to have chromaticity coordinate values of "x" in the range of 0.29 to 0.33 both inclusive and "y" in the range of 0.31 to 0.355 both inclusive when $\Delta n \times d$ is in the range of 0.24 to 0.39 both inclusive, wherein $\Delta n$ indicates index anisotropy of liquid crystal of said liquid crystal layer, and "d" indicates a thickness of said liquid crystal layer.

9. The in-plane switching type liquid crystal display as set forth in claim 8, wherein a distance between said first and second transparent substrates is in the range of 3.5 μm to 5.5 μm.

10. The in-plane switching type liquid crystal display as set forth in claim 8, wherein said back-light source is comprised of at least two fluorescent lamps having different chromaticity.

11. A method of operating an in-plane switching type liquid crystal display, comprising the step of determining chromaticity of back-light in accordance with chromaticity variation in display nonuniformity caused by a dispersion in a distance between transparent substrates, to thereby nearly equalize said chromaticity of said back-light to chromaticity in said display nonuniformity for rendering said display nonuniformity inconspicuous.

12. The method as set forth in claim 11, further comprising the step of setting a distance between said transparent substrates to be in the range of 3.5 $\mu$m to 5.5 $\mu$m.

13. A method of operating an in-plane switching type liquid crystal display, comprising the step of controlling chromaticity of back-light to have chromaticity coordinate values of "x" in the range of 0.29 to 0.33 both inclusive and "y" in the range of 0.31 to 0.355 both inclusive when $\Delta n \times d$ is in the range of 0.24 to 0.39 both inclusive, wherein $\Delta n$ indicates index anisotropy of liquid crystal of a liquid crystal layer, and "d" indicates a thickness of said liquid crystal layer.

14. The method as set forth in claim 13, further comprising the step of setting a distance between said transparent substrates to be in the range of 3.5 $\mu$m to 5.5 $\mu$m.

15. A method of operating an in-plane switching type liquid crystal display including two transparent substrates spaced away from each other by a distance, said method comprising the step of setting chromaticity of a back-light to be lower than chromaticity to be obtained when said transparent substrates are spaced away from each other by said distance.

16. The method as set forth in claim 15, further comprising the step of setting a distance between said transparent substrates to be in the range of 3.5 $\mu$m to 5.5 $\mu$m.

* * * * *

UNITED STATES PATENT AND TRADEMARK OFFICE
CERTIFICATE OF CORRECTION

PATENT NO.: 6,104,463
DATED: August 15, 2000
INVENTOR(S): Hideo SHIBAHARA

It is certified that error(s) appears in the above-identified patent and that said Letters Patent is hereby corrected as shown below:

Column 3, line 36, delete "Feb." insert --February--;

line 45, delete "Sep." insert --September --;

line 53, delete "Dec." insert --December --;

line 60, delete "Sep." insert --September--;

Column 7, line 3, delete "4.0m" insert --4.0 µm--;

line 17, delete " "x" " insert --"x"--

Column 8, line 62, delete "Oct." insert --October--

Signed and Sealed this

Fifteenth Day of May, 2001

*Attest:*

NICHOLAS P. GODICI

*Attesting Officer*     *Acting Director of the United States Patent and Trademark Office*